US010892785B2

(12) United States Patent
Su et al.

(10) Patent No.: US 10,892,785 B2
(45) Date of Patent: Jan. 12, 2021

(54) METHOD FOR DETERMINING MIMO DETECTION MATRIX OF SCHEDULED UE

(71) Applicant: China Academy of Telecommunications Technology, Beijing (CN)

(72) Inventors: Xin Su, Beijing (CN); Yang Song, Beijing (CN); Chuanjun Li, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 304 days.

(21) Appl. No.: 16/066,226

(22) PCT Filed: Nov. 28, 2016

(86) PCT No.: PCT/CN2016/107528
§ 371 (c)(1),
(2) Date: Jun. 26, 2018

(87) PCT Pub. No.: WO2017/114053
PCT Pub. Date: Jul. 6, 2017

(65) Prior Publication Data
US 2020/0274558 A1 Aug. 27, 2020

(30) Foreign Application Priority Data
Dec. 28, 2015 (CN) .......................... 2015 1 1001286

(51) Int. Cl.
*H04B 1/00* (2006.01)
*H04B 1/10* (2006.01)
(Continued)

(52) U.S. Cl.
CPC ......... *H04B 1/0025* (2013.01); *H04B 1/0046* (2013.01); *H04B 1/1081* (2013.01);
(Continued)

(58) Field of Classification Search
CPC .. H04B 1/0025; H04B 1/0046; H04B 1/1081; H04L 25/03; H04L 2025/03426; H04W 88/085
See application file for complete search history.

(56) References Cited

U.S. PATENT DOCUMENTS

2013/0114656 A1* 5/2013 Sayana ................ H04B 7/024
375/219
2014/0226736 A1* 8/2014 Niu ..................... H04L 27/2628
375/260
(Continued)

FOREIGN PATENT DOCUMENTS

CN 103546412 A 1/2014
CN 103838552 A 6/2014
(Continued)

OTHER PUBLICATIONS

Liu Jingchu et al: "Redesigning fronthaul for next-generation networks: beyond baseband samples and point-to-point links", Technical Report of Wireless Networking Group, Coordinated Science Laboratory; Dept. Electrical and Computer Engineering; University of Illinois At Urbana-Champaign, US, vol. 22, No. 5, Oct. 1, 2015 (Oct. 1, 2015), pp. 90-97, XP011588510.
(Continued)

*Primary Examiner* — Jackie Zuniga Abad
(74) *Attorney, Agent, or Firm* — Foley & Lardner LLP

(57) ABSTRACT

The present application discloses a method and an apparatus for signal processing. In the present application, since a front end device in a base station system performs MIMO detection and related baseband-processing of a time domain signal received from an antenna unit and transmits the signal that is baseband-processed to a back end device of the base station system, the back end device merely performs other baseband processing, apart from the MIMO detection and the related baseband processing. Compared with the prior art, the embodiments of the present application move some of the baseband processing forward to be implemented on a front end device such that only the data of each scheduled user with less redundancy are required to be transmitted in an interface between the front end device and a backend (Continued)

device, reducing the pressure on the rate of data transmission between the front end device and the back end device.

16 Claims, 6 Drawing Sheets

(51) Int. Cl.
*H04L 25/03* (2006.01)
*H04W 88/08* (2009.01)

(52) U.S. Cl.
CPC ........... *H04L 25/03* (2013.01); *H04W 88/085* (2013.01); *H04L 2025/03426* (2013.01)

(56) References Cited

U.S. PATENT DOCUMENTS

2015/0117277 A1* 4/2015 Liu ........................ H04L 1/00
 370/280
2015/0341802 A1 11/2015 Chiang et al.

FOREIGN PATENT DOCUMENTS

| CN | 104079329 A | 10/2014 |
|---|---|---|
| CN | 104378848 A | 2/2015 |
| CN | 104378849 A | 2/2015 |
| CN | 104378850 A | 2/2015 |
| EP | 2 445 253 A1 | 4/2012 |
| WO | WO-2014/056306 A1 | 4/2014 |

OTHER PUBLICATIONS

Niu Huaning et al: "RAN architecture options and performance for 5G network evolution", 2014 IEEE Wireless Communications and Networking Conference Workshops (WCNCW), IEEE, Apr. 6, 2014 (Apr. 6, 2014), pp. 294-298, XP032668353.

* cited by examiner

METHOD FOR DETERMINING MIMO DETECTION MATRIX OF SCHEDULED UE

CROSS REFERENCE

This application is a US National Stage of International Application No. PCT/CN2016/107528, filed on Nov. 28, 2016, designating the United States, and claiming the benefit and priority of Chinese Patent Application No. 201511001286.6, filed with the Chinese Patent Office on Dec. 28, 2015, and entitled "a method and apparatus for processing a signal". The entire disclosure of each of the above applications is incorporated herein by reference.

FIELD

The present disclosure relates to the field of communications, and particularly to a method and apparatus for processing a signal.

BACKGROUND

Since the multiple-input and multiple-output (MIMO) technology is important to improve the peak rate and system spectral efficiency, radio access technology standards such as long-term evolution (LTE) and LTE-advanced (LTE-A) are built upon MIMO plus the orthogonal frequency-division multiplexing (OFDM) technology. The performance gain of the MIMO technology comes from the spatial degrees of freedom available in a multi-antenna system, so one of the most important evolvements in standardization of the MIMO technology is the extension of dimensions. In the LTE Release 8 (Rel-8 or R 8), MIMO transmission of at most four layers is supported. In the LTE Rel-9, at most four downlink transmission data layers is supported in multi-user MIMO (MU-MIMO) of the transmission mode (TM)-8. And an 8-port channel state information-reference signal (CSI-RS), a user equipment (UE)-specific reference signal (URS) and a multi-granularity codebook were introduced into the LTE Rel-10 to improve the space resolution of the channel state information, and to extend the transmission capacity of single-user MIMO (SU-MIMO) to at most 8 transmission data layers.

In a base station antenna system having a structure of a passive antenna system (PAS), a plurality of antenna ports (where each port corresponds to a separate radio frequency-intermediate frequency-baseband channel) are arranged horizontally, and a plurality of array elements in a vertical dimension corresponding to each port are connected through a radio frequency cable. In this case, the MIMO technology can optimize spatial-domain characteristics of signals of respective terminals in the horizontal dimension only by adjusting relative amplitudes and/or phases between the different ports in the horizontal dimension, and only uniform sector-level beam-forming can be made in the vertical dimension. After the Active Antenna System (AAS) technology has been introduced into mobile communication systems, a base station antenna system can obtain more degrees of freedom in the vertical dimension, and thus can optimize signals at a UE level in the three dimensional space.

As the scale of antennas grows, interfaces (also referred to as fronthauls) between front end devices (i.e., remote radio units, RRUs) and backend devices (i.e., base band units, BBU) in base station systems have significant data traffic burden. A common public radio interface (CPRI) is a kind of commonly seen interface between a BBU in a base station system and a backend device on a tower. Taking a bandwidth of 20 MHz as an example, as per this interface protocol, when a data sampling rate is 30.72 MHz, after I/Q branch samples of OFDM modulation symbols are sampled using 16 bits and encoded using 8B/10B respectively, a data rate required by data on a single antenna port is 30.72*16*2*10/8=1228.8 Mbps. As such, for uplink reception, when the base station uses eight antenna ports, a data rate thereof is R=9830.4 Mbps, and generally a 10G optic fiber is required or two 5G or 6G optic fibers are required (a 5G or 6G optic fiber may be in use if after lossy compression). When the base station has 128 ports, a data rate thereof is R=157286.4 Mbps, and without compression 32 5G/6G optic fibers or 16 10G optic fibers are required.

When the scale or bandwidth of the antennas is further extended (for example, a future system might use a system bandwidth of more than 1 GHz), the amount of data redundancy and a burden of data transmission of the fronthaul grow, causing the number of optic fibers to increase accordingly, thus greatly hindering the devices in the active antenna system from being miniaturized, installed, operated, and maintained.

SUMMARY

Embodiments of the disclosure provide a method and apparatus for processing a signal so as to lower the amount of data redundancy of an interface between a front end device and a backend device in a base station system.

An embodiment of the disclosure provides a method for processing a signal. The method includes: receiving, by a front end device of a base station system, a time-domain signal transmitted by an antenna element; performing, by the front end device, MIMO detection and related baseband processing on the time-domain signal; and transmitting, by the front end device, the signal, on which the baseband processing is performed, to a backend device of the base station system.

In an implementation, performing, by the front end device, the MIMO detection and related baseband processing on the time-domain signal includes: converting, by the front end device, the time-domain signal into a frequency-domain signal; performing, by the front end device, resource de-mapping on the frequency-domain signal, and obtaining frequency-domain data of a scheduled UE; performing, by the front end device, the MIMO detection on the frequency-domain data of the scheduled UE, and obtaining a frequency-domain transmission data layer of the scheduled UE; and converting, by the front end device, the frequency-domain transmission data layer of the scheduled UE into a time-domain transmission data layer.

In an implementation, after transmitting, by the front end device, the signal, on which the baseband processing is performed, to the backend device of the base station system, the method further includes: mapping, by the backend device, the time-domain transmission data layer of the scheduled UE to a codeword and processing, by the backend device, the codeword into a transport block.

In an implementation, after converting, by the front end device, the frequency-domain transmission data layer of the scheduled UE into the time-domain transmission data layer, the method further includes: mapping, by the front end device, the time-domain transmission data layer of the scheduled UE to a codeword.

In an implementation, after transmitting, by the front end device, the signal, on which the baseband processing is performed, to the backend device of the base station system, the method further includes: processing, by the backend device, the codeword into a transport block.

In an implementation, after mapping, by the front end device, the time-domain transmission data layer of the scheduled UE to the codeword, the method further includes: processing, by the front end device, the codeword into a transport block.

In an implementation, the method further includes: estimating, by the front end device, a channel, interference, and noise of a scheduled UE, and transmitting information about the estimated channel, interference, and noise to the backend device; and performing, by the backend device, uplink scheduling, and determining an MIMO detection matrix of the scheduled UE, according to the estimation information, and transmitting uplink resource allocation scheme information and the MIMO detection matrix of the scheduled UE to the front end device.

An embodiment of the disclosure provides another method for processing a signal. The method includes: receiving, by a backend device of a base station system, a signal, on which MIMO detection and related baseband processing is performed, transmitted by a front end device of the base station system; and performing, by the backend device, other baseband processing different from the MIMO detection and related baseband processing on the signal received from the front end device.

In an implementation, if the MIMO detection and related baseband processing includes the operations of converting the time-domain signal into a frequency-domain signal; performing resource de-mapping on the frequency-domain signal, and obtaining frequency-domain data of a scheduled UE; performing MIMO detection on the frequency-domain data of the scheduled UE, and obtaining a frequency-domain transmission data layer of the scheduled UE; and converting the frequency-domain transmission data layer of the scheduled UE into a time-domain transmission data layer, then the other baseband processing includes: mapping the time-domain transmission data layer of the scheduled UE to a codeword; and processing the codeword into a transport block.

In an implementation, if the MIMO detection and related baseband processing includes the operations of converting the time-domain signal into a frequency-domain signal; performing resource de-mapping on the frequency-domain signal, and obtaining frequency-domain data of a scheduled UE; performing MIMO detection on the frequency-domain data of the scheduled UE, and obtaining a frequency-domain transmission data layer of the scheduled UE; converting the frequency-domain transmission data layer of the scheduled UE into a time-domain transmission data layer; and mapping the time-domain transmission data layer of the scheduled UE to a codeword, then the other baseband processing includes processing the codeword into a transport block.

In an implementation, the method further includes: receiving, by the backend device, information about an estimated channel, interference, and noise of a scheduled UE transmitted by the front end device; performing uplink scheduling and determining an MIMO detection matrix of the scheduled UE, according to the estimation information; and transmitting uplink resource allocation scheme information and the MIMO detection matrix of the scheduled UE to the front end device.

An embodiment of the disclosure provides a front end device of a base station system. The front end device includes a transceiver, a processor, and a memory storing at least one instruction. The processor is configured to execute the at least one instruction to: control the transceiver to receive a time-domain signal transmitted by an antenna element; perform MIMO detection and related baseband processing on the time-domain signal; and control the transceiver to transmit the signal, on which the baseband processing is performed, to a backend device of the base station system.

In an implementation, the processor is further configured to execute the at least one instruction to: convert the time-domain signal into a frequency-domain signal; perform resource de-mapping on the frequency-domain signal, and to obtain frequency-domain data of a scheduled UE; perform MIMO detection on the frequency-domain data of the scheduled UE, and to obtain a frequency-domain transmission data layer of the scheduled UE; and convert the frequency-domain transmission data layer of the scheduled UE into a time-domain transmission data layer.

In an implementation, the processor is further configured to execute the at least one instruction to map the time-domain transmission data layer of the scheduled UE to a codeword.

In an implementation, the processor is further configured to execute the at least one instruction to process the codeword into a transport block.

In an implementation, the processor is further configured to execute the at least one instruction to: estimate a channel, interference, and noise of a scheduled UE; control the transceiver to transmit information about the estimated channel, interference, and noise to the backend device; and control the transceiver to receive uplink resource allocation scheme information and an MIMO detection matrix determined by the backend device according to the estimation information.

Another embodiment of the disclosure provides a backend device of a base station system. The device includes a receiver, a processor, and a memory storing at least one instruction. The processor is configured to execute the at least one instruction to: control the receiver to receive a signal, on which MIMO detection and related baseband processing is performed, transmitted by a front end device of the base station system; and perform other baseband processing different from the MIMO detection and related baseband processing on the signal received from the front end device.

In an implementation, if the MIMO detection and related baseband processing comprises the operations of converting the time-domain signal into a frequency-domain signal; performing resource de-mapping on the frequency-domain signal, and obtaining frequency-domain data of a scheduled UE; performing MIMO detection on the frequency-domain data of the scheduled UE, and obtaining a frequency-domain transmission data layer of the scheduled UE; and converting the frequency-domain transmission data layer of the scheduled UE into a time-domain transmission data layer, then the processor is further configured to execute the at least one instruction to: map the time-domain transmission data layer of the scheduled UE to a codeword; and process the codeword into a transport block.

In an implementation, if the MIMO detection and related baseband processing includes the operations of converting the time-domain signal into a frequency-domain signal; performing resource de-mapping on the frequency-domain signal, and obtaining frequency-domain data of a scheduled UE; performing MIMO detection on the frequency-domain data of the scheduled UE, and obtaining a frequency-domain transmission data layer of the scheduled UE; converting the frequency-domain transmission data layer of the scheduled UE into a time-domain transmission data layer; and mapping the time-domain transmission data layer of the scheduled UE to a codeword, then the processor is further configured to execute the at least one instruction to process the codeword into a transport block.

In an implementation, the device further includes a transmitter, and the processor is further configured to execute the at least one instruction to: control the receiver to receive information about an estimated channel, interference, and noise of a scheduled UE transmitted by the front end device; perform uplink scheduling; determine an MIMO detection matrix of the scheduled UE, according to the estimation information; and control the transmitter to transmit uplink resource allocation scheme information and the MIMO detection matrix of the scheduled UE to the front end device.

BRIEF DESCRIPTION OF THE DRAWINGS

FIG. 4A to FIG. 3D are schematic structural diagrams of backend devices in base station systems according to embodiments of the disclosure.

DETAILED DESCRIPTION OF THE EMBODIMENTS

Figure 1:
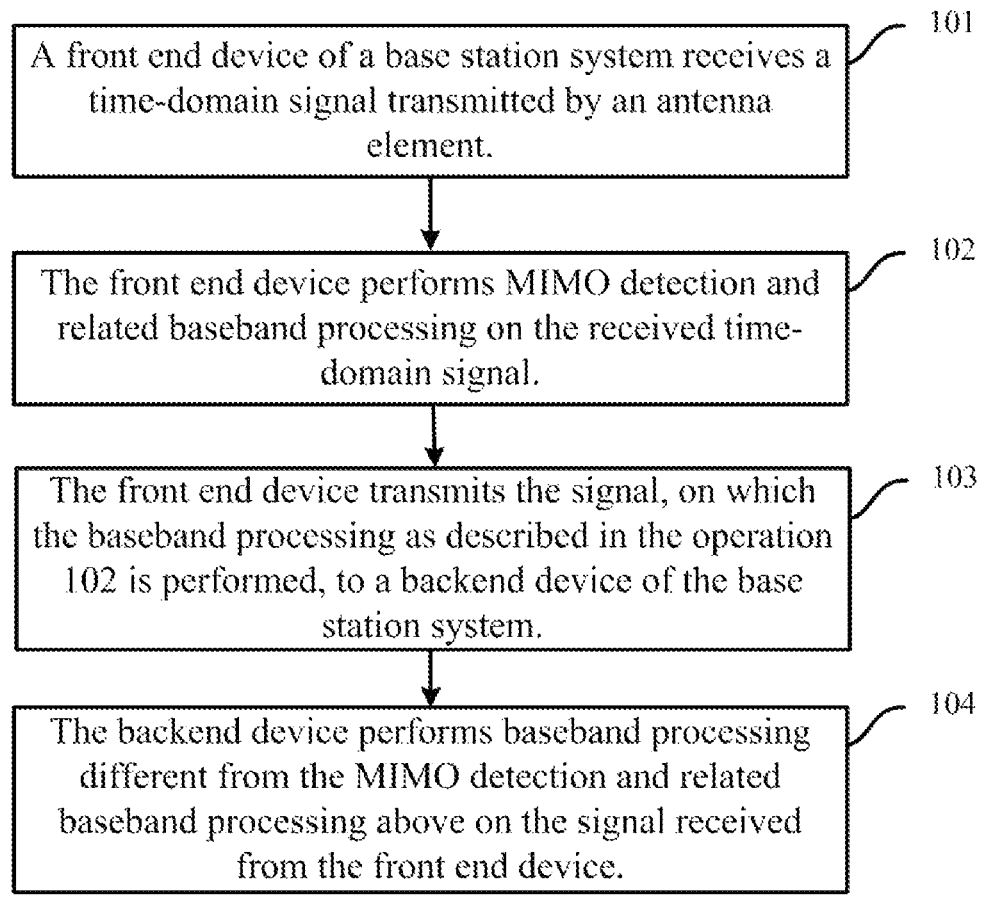
FIG. 1 is a schematic flow chart of processing a signal according to an embodiment of the disclosure.

The architecture of an existing baseband system can include a BBU, an RRU and a PAS, or a BBU and an AAS. The BBU, the RRU and the PAS constitute a PAS structured antenna system, and in this baseband system, the RRU is a front end device, and the BBU is a backend device. In the architecture including the BBU and the AAS, an RRU is integrated with an antenna element, which is referred to as an AAS system, and in this baseband system, the AAS system is a front end device, and the BBU is a backend device.

In the architecture of the base station including the BBU, the RRU and the PAS, or including the BBU and the AAS, as for the uplink, general operations to be performed on an interface connecting the BBU and the RRU, or an interface connecting the BBU and the AAS are as follows.

At the fronthaul transmission side (the RRU side): I/Q branches of a time-domain sample signal on each receiver unit (RU) port are sampled respectively (e.g., sampled using 16 bits on a CPRI interface), the data is encoded (e.g., encoded using 8B/10B on the CPRI interface), and the data to be transmitted is compressed as needed.

At the fronthaul reception side (the BBU side): the time-domain samples are decompressed and decoded into the time-domain sample signal.

Operations to be performed by the BBU at the physical layer generally include: conversion of a time-domain signal into a frequency-domain signal; resource de-mapping; MIMO detection; inverse transform reception; and layer to codeword (CW) de-mapping.

As described above, there is considerable redundancy of the data transmitted on the CPRI interface in the process above.

By way of an example, if the number of virtual antenna ports is $N_{Layer}$ and the number of RU ports is $N_{RU}$, then with an algorithm of linear beam-forming, an MIMO detection process can be represented as $y_{layer}=W\times x_{RU}$. $y_{Layer}$ is an $N_{Layer}\times 1$-dimension vector representing a signal vector consisted of transmission data layers. $x_{RU}$ is an $N_{RU}\times 1$-dimension vector representing a signal vector from the RU ports. A mapping relationship between them is determined by an $N_{Layer}\times N_{RU}$-dimension MIMO detection matrix W. For a massive MIMO system, $N_{RU}$ is typically far greater than $N_{Layer}$. As per the existing LTE specification, $N_{Layer}$ is at most 4. In order for a significant performance gain, the value of $N_{RU}$ may be 64, 128, 256, or even more. In this case, there is considerable redundancy of the data before MIMO detection.

In order to alleviate a burden on a rate of data transmission between the front end device and the backend device in the base station system, the embodiments of the disclosure provide a method for processing a signal, and a base station system. In the embodiments of the disclosure, a part of baseband processing functions (e.g., an MIMO detection task capable of significantly cutting down redundancy) are transferred forward and integrated into a front end device such as the RRU or the AAS. In this way, only less redundant data (e.g., data at the codeword or layer level) of each UE, and a resource mapping rule, a beam-forming weight matrix, and other necessary information of each UE need to be transmitted via the interface between the RRU or the AS and the BBU, thereby alleviating the burden on the rate of data transmission between the front end device and the backend device in the base station system, and reducing the amount of data to be transmitted, so as to reduce the number of optic fibers.

The embodiments of the disclosure is applicable to a base station system including a front end device and a backend device, e.g., a base station system including a BBU, an RRU, and a PAS, or a BBU and an AAS, where an interface between the front end device and the backend device can operate with the CPRI protocol, and the interface of the front end device to the backend device can be referred to as a fronthaul.

The embodiments of the disclosure are described below in details with reference to the drawings.

Referring to FIG. 1, which is a schematic flow chart of processing a signal according to an embodiment of the disclosure, the flow is performed at the base station system side. As illustrated, the flow can include the following operations.

Operation 101: a front end device of a base station system receives a time-domain signal transmitted by an antenna element.

Given a bandwidth of 20 MHz, for example, as per the CPRI interface protocol between a front end device and a backend device, with a data sampling rate of 30.72 MHz, the front end device can sample using 16 bits I/Q branch samples of OFDM modulation symbols from an antenna element respectively, and obtain time-domain samples.

Operation 102: the front end device performs MIMO detection and related baseband processing on the received time-domain signal.

Operation 103: the front end device transmits the signal, on which the baseband processing as described in the operation 102 is performed, to a backend device of the base station system. In an implementation, the front end device can transmit the signal, on which the baseband processing as described in the operation 102 is performed, to the backend device of the base station system via a fronthaul.

Furthermore after the backend device receives the signal transmitted by the front end device, the method further includes the following operation.

Operation 104: the backend device performs baseband processing different from the MIMO detection and related baseband processing above on the signal received from the front end device.

Furthermore the front end device can estimate a channel, interference, and noise of each scheduled UE, and transmit information about the estimated channel, interference, and noise to the backend device via the fronthaul. The backend device can perform uplink scheduling, and calculate an MIMO detection matrix of each scheduled UE, according to the received information about the estimated channel, interference, and noise, and transmit uplink resource allocation scheme information and the MIMO detection matrix of each scheduled UE to the front end device via the fronthaul, so that the front end device performs MIMO detection according to the MIMO detection matrixes.

In the embodiment above of the disclosure, in the base station system, the front end device performs MIMO detection and related baseband processing on the received time-domain signal from the antenna element, and transmits the baseband-processed signal to the backend device of the base station system, so that the backend device only performs the other baseband processing than the MIMO detection and related baseband processing. As compared with the existing technologies, a part of baseband processing operations are transferred forward to and performed by the front end device in the embodiment of the disclosure, so that less redundant data (e.g., data at the codeword level or transmission data layer level) of each scheduled UE needs to be transmitted via the interface between the front end device and the backend device, thereby alleviating a burden on a rate of data transmission between the front end device and the backend device.

The embodiment of the disclosure can significantly lower the amount of redundancy of the data on the interface between the backend device and the front end device (e.g., an RRU, an AAS, etc.). Since operations of resource allocation, scheduling, beam-forming/pre-coding matrix calculation, etc., are still performed on the backend device, this structure can be well adapted to a cloud radio access network (C-RAN, a green radio access network architecture based upon centralized processing, cooperative radio, and real-time cloud computing) structure centered on cooperation, centralization, and cloud computing, so that the network side can perform coordination and optimization comprehensively in a larger range at a higher level. Also since the core computing task is performed at the backend or the cloud end, and all the operations added to the front end device, such as resource de-mapping (in the time, frequency, or spatial domain) or single-carrier frequency division multiple access (SC-FDMA) signal detection, are simple, the integrity, complexity, power consumption, and cost of the front end device are not significantly affected.

Figure 2:
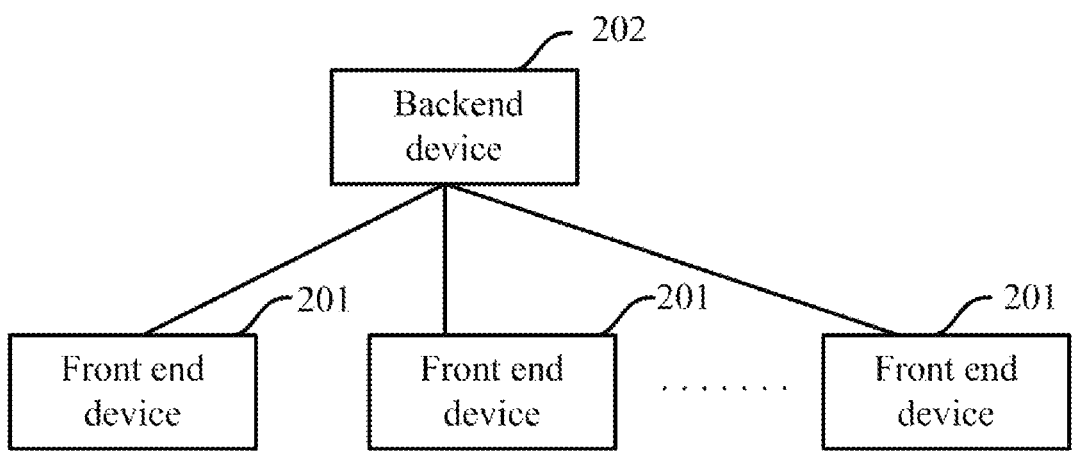
FIG. 2 is a schematic structural diagram of a base station system according to an embodiment of the disclosure.

In some embodiments, in the operation 102 as illustrated in FIG. 2, the front end device can perform the MIMO detection and related baseband processing according to the uplink resource allocation scheme and the MIMO detection matrix of each scheduled UE. In some implementations, the performed MIMO detection and related baseband processing can include the following processing operations.

(1) The front end device converts the time-domain signal into a frequency-domain signal. In an implementation, the front end device can convert the signal time-domain samples received on each RU port into frequency-domain samples through fast Fourier transform (FFT).

(2) The front end device performs resource de-mapping on the frequency-domain signal, and obtains frequency-domain data of each scheduled UE. In an implementation, the front end device extracts a frequency-domain sample signal of each scheduled UE respectively according to the resource allocation scheme of the scheduled UE.

(3) The front end device performs MIMO detection on the frequency-domain data of each scheduled UE, and obtains a frequency-domain transmission data layer of each scheduled UE, respectively. In an implementation, the front end device can perform MIMO detection on the signals of the respective scheduled UEs according to the MIMO detection matrixes, and obtain respective transmission data layers of the respective UEs.

(4) The front end device converts a frequency-domain transmission data layer of each scheduled UE into a time-domain transmission data layer. In an implementation, the front end device performs inverse transformation on the respective transmission data layers through inverse discrete Fourier transform (IDFT) to thereby convert them from the frequency domain to the time domain.

Furthermore the front end device transmits the data of each scheduled UE at a time-domain transmission data layer to the backend device via the fronthaul, respectively.

Correspondingly, the baseband processing different from the MIMO detection and related baseband processing the backend device can perform in the operation 104 are as follows.

(5) The backend device maps the data of the scheduled UEs at the time-domain transmission data layers to a codeword. In an implementation, the backend device can merge the transmission data layers into the codeword.

(6) The backend device processes the codeword into a transport block. In an implementation, the backend device can perform operations such as demodulating and de-scrambling on the codeword, and recover a transport block (TB) bit stream.

It shall be noted that the front device can also perform some other necessary baseband processing in addition to the baseband processing described in (1) to (4) above. The backend device can also perform some other necessary baseband processing in addition to the baseband processing described in (5) and (6) above.

In some other embodiments, in the operation 102 as illustrated in FIG. 1, the front end device can perform the MIMO detection and related baseband processing according to the uplink resource allocation scheme and the MIMO detection matrix of each scheduled UE, respectively. In some implementations, the performed MIMO detection and related baseband processing can include the following processing operations.

(1) The front end device converts the time-domain signal into a frequency-domain signal. In an implementation, the front end device can convert the signal time-domain samples received on each RU port into frequency-domain samples through FFT.

(2) The front end device performs resource de-mapping on the frequency-domain signal, and obtains frequency-domain data of each scheduled UE. In an implementation, the front end device extracts a frequency-domain sample signal of each scheduled UE respectively according to the resource allocation scheme of the scheduled UE, respectively.

(3) The front end device performs MIMO detection on the frequency-domain data of each scheduled UE, and obtains a frequency-domain transmission data layer of each scheduled UE. In an implementation, the front end device can perform MIMO detection on the signals of the respective scheduled UEs according to the MIMO detection matrixes, and obtain respective transmission data layers of the respective UEs.

(4) The front end device converts the frequency-domain transmission data layers of the scheduled UEs into time-domain transmission data layers. In an implementation, the front end device performs inverse transformation on the respective transmission data layers through IDFT to convert them from the frequency domain to the time domain.

(5) The front end device maps the data of the scheduled UEs at time-domain transmission data layers to a codeword. In an implementation, the front end device can merge the transmission data layers into the codeword.

Furthermore the front end device transmits the codeword, to which the data is mapped, to the backend device via the fronthaul.

Correspondingly, the baseband processing different from the MIMO detection and related baseband processing the backend device can perform in the operation 104 can include the following operations.

(6) The backend device processes the codeword into a transport block. In an implementation, the backend device can perform operations such as demodulating and de-scrambling on the codeword, and recover a TB bit stream.

It shall be noted that the front device can also perform some other necessary baseband processing in addition to the baseband processing described in (1) to (5) above. The backend device can also perform some other necessary baseband processing in addition to the baseband processing described in (6) above.

In some other embodiments, in the operation 102 as illustrated in FIG. 1, the front end device can perform the MIMO detection and related baseband processing according to the uplink resource allocation scheme and the MIMO detection matrix of each scheduled UE. In some implementations, the performed MIMO detection and related baseband processing can include the following processing operations.

(1) The front end device converts the time-domain signal into a frequency-domain signal. In an implementation, the front end device can convert the signal time-domain samples received on each RU port into frequency-domain samples through FFT.

(2) The front end device performs resource de-mapping on the frequency-domain signal, and obtains frequency-domain data of each scheduled UE. In an implementation, the front end device extracts a frequency-domain sample signal of each scheduled UE respectively according to the resource allocation scheme of the scheduled UE.

(3) The front end device performs MIMO detection on the frequency-domain data of each scheduled UE, and obtains a frequency-domain transmission data layer of each scheduled UE. In an implementation, the front end device can perform MIMO detection on the signals of the respective scheduled UEs according to the MIMO detection matrixes, and obtain respective transmission data layers of the respective UEs.

(4) The front end device converts frequency-domain transmission data layers of the scheduled UEs into time-domain transmission data layers. In an implementation, the front end device performs inverse transformation on the respective transmission data layers through IDFT to convert them from the frequency domain to the time domain.

(5) The front end device maps the data of each scheduled UE at the time-domain transmission data layers to a codeword. In an implementation, the front end device can merge the transmission data layers into the codeword.

(6) The backend device processes the codeword into a transport block. In an implementation, the backend device can perform operations such as demodulating and de-scrambling on the codeword, and recover a TB bit stream.

Furthermore the front end device transmits the TB, to which the codeword is mapped, to the backend device via the fronthaul.

It shall be noted that the front device can also perform some other necessary baseband processing in addition to the baseband processing described in (1) to (6) above. The backend device can also perform some necessary baseband processing upon reception of the transport block transmitted by the front end device via the front haul.

Based upon the same technical idea, an embodiment of the disclosure further provides a base station system.

Referring to FIG. 2 which is a schematic structural diagram of a base station system according to an embodiment of the disclosure, the base station system can include one or more front end devices 201 and a backend device 202. The front end device(s) 201 and the backend device 202 are connected through cable(s), e.g., optic fiber(s). The base station system can be a base station system including a BBU, an RRU and a PAS, or can be a base station system including a BBU and an AAS. The interface between a front end device and the backend device can operate with the CPRI protocol, and the interface between a front end device and the backend device can be referred to as a fronthaul.

In the base station system, each front end device 201 can be configured to receive a time-domain signal transmitted by an antenna element, to perform MIMO detection and related baseband processing on the time-domain signal, and transmit the signal, on which the baseband processing is performed, to the backend device 202 of the base station system. The backend device 202 can be configured to perform baseband processing different from the MIMO detection and related baseband processing on the signal(s) received from the front end device(s) 201.

Based upon the same technical idea, an embodiment of the disclosure further provides a front end device in a base station system.

Figure 3A:
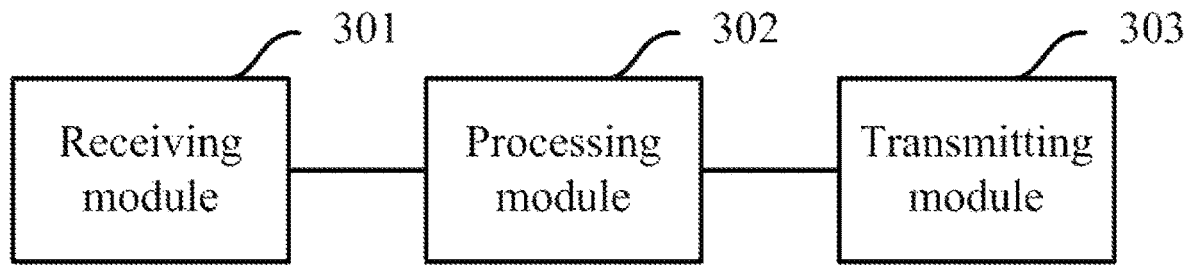
FIG. 3A to FIG. 3D are schematic structural diagrams of front end devices in base station systems according to embodiments of the disclosure.

Referring to FIG. 3A, which is a schematic structural diagram of a front end device according to an embodiment of the disclosure, the front end device can include a receiving module 301, a processing module 302, and a transmitting module 303.

The receiving module 301 is configured to a receive time-domain signal transmitted by an antenna element.

The processing module 302 is configured to perform MIMO detection and related baseband processing on the time-domain signal.

The transmitting module 303 is configured to transmit the signal, on which the baseband processing is performed, to a backend device of the base station system.

Figure 3B:
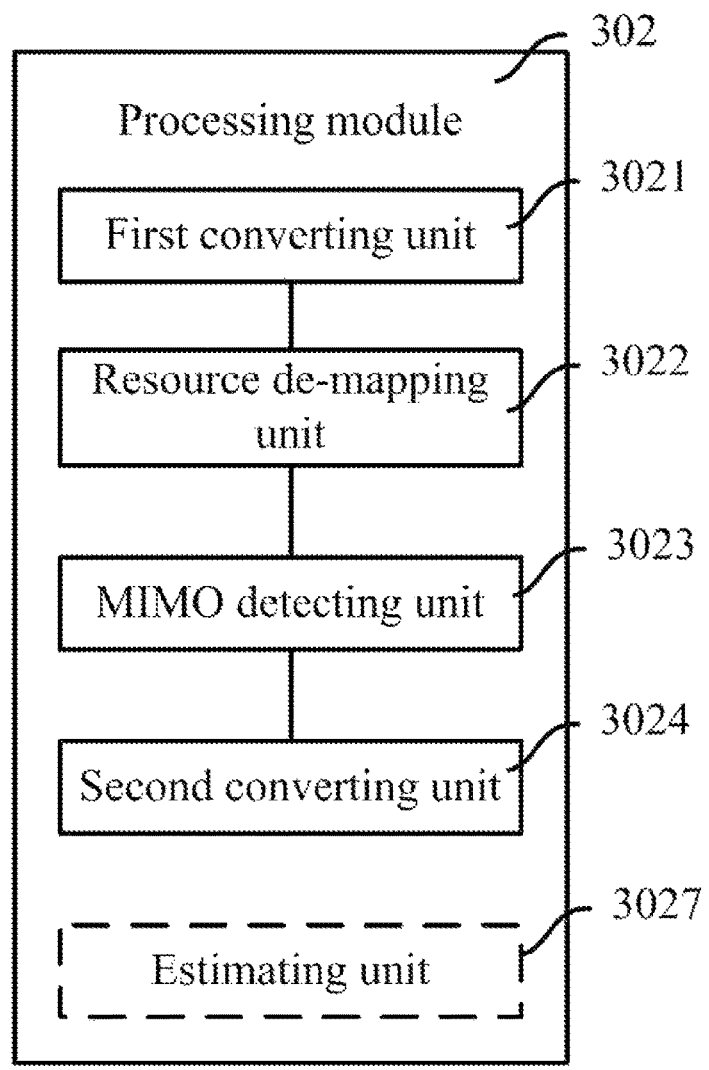

In an embodiment, a possible structure of the front end device is illustrated by FIG. 3B. And the processing module 302 can include: a first converting unit 3021 configured to convert the time-domain signal into a frequency-domain signal; a resource de-mapping unit 3022 configured to perform resource de-mapping on the frequency-domain signal, and to obtain frequency-domain data of a scheduled UE; an MIMO detecting unit 3023 configured to perform MIMO detection on the frequency-domain data of the scheduled UE, and to obtain a frequency-domain transmission data layer of the scheduled UE; and a second converting unit 3024 configured to convert the frequency-domain transmission data layer of the scheduled UE into a time-domain transmission data layer.

Figure 3C:
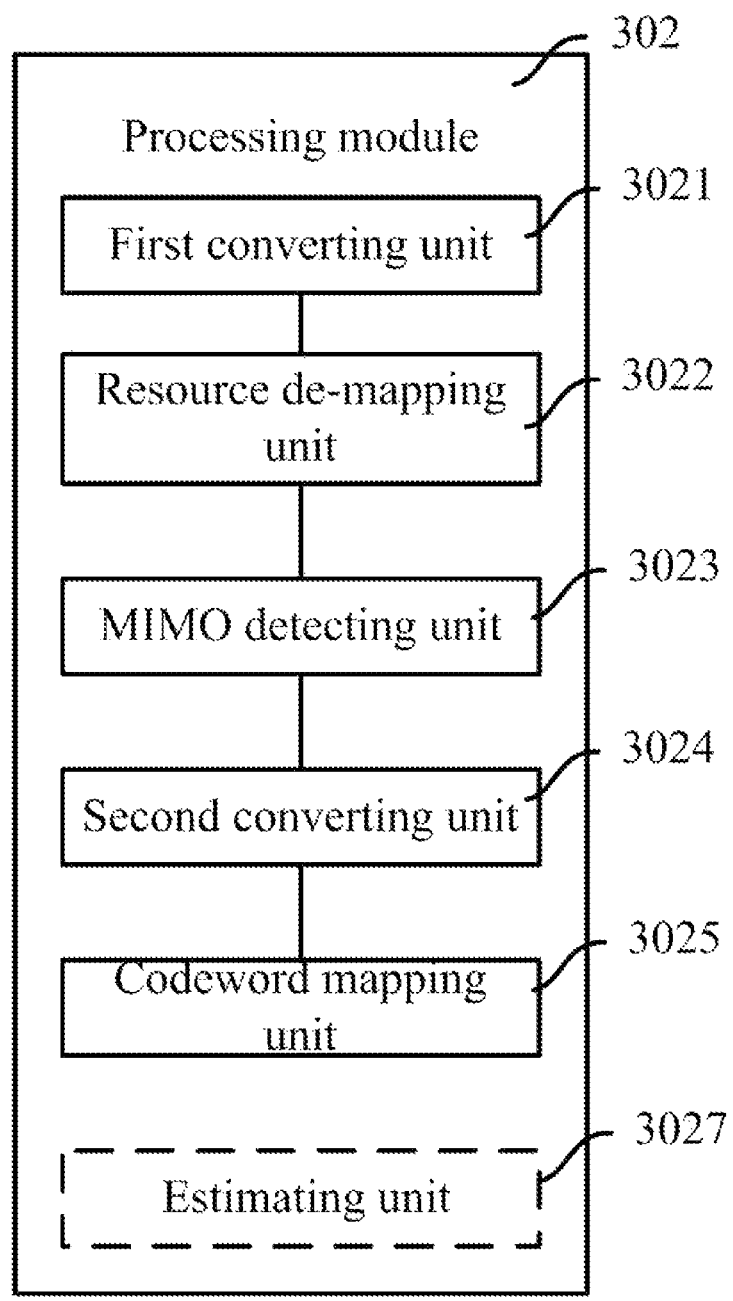

In another embodiment, another possible structure of the front end device is illustrated by FIG. 3C. The processing module 302 can include the first converting unit 3021, the resource de-mapping unit 3022, the MIMO detecting unit 3023, and the second converting unit 3024 above, and further include a codeword mapping unit 3025 configured to map the time-domain transmission data layer of the scheduled UE to a codeword.

Figure 3D:
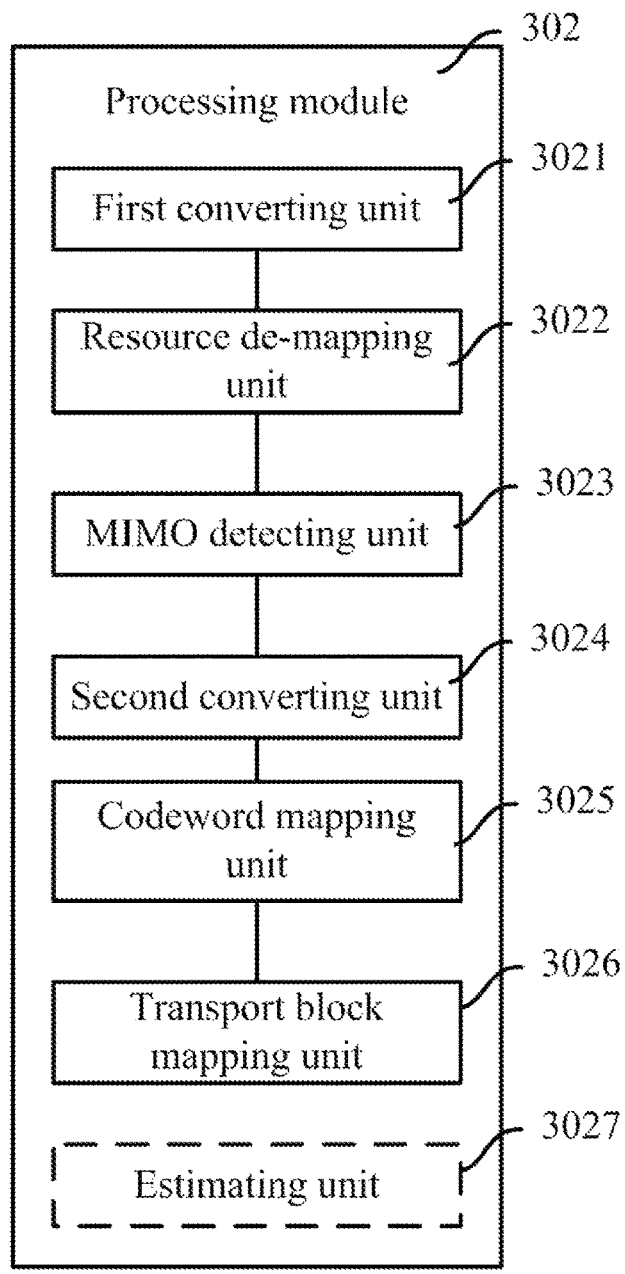

In another embodiment, another possible structure of the front end device is illustrated by FIG. 3D, the processing module 302 can include the first converting unit 3021, the resource de-mapping unit 3022, the MIMO detecting unit 3023, the second converting unit 3024, and the codeword mapping unit 3025 above, and further include a transport block mapping unit 3026 configured to process the codeword into a transport block.

Furthermore, in addition to FIG. 3A, FIG. 3B, FIG. 3C, or FIG. 3D, the processing module 302 can further include an estimating unit 3027 configured to estimate a channel, interference, and noise of the scheduled UE, to transmit information about the estimated channel, interference, and noise to the backend device, and to receive uplink resource allocation scheme information and an MIMO detection matrix determined by the backend device according to the estimated information.

Based upon the same technical idea, an embodiment of the disclosure further provides a backend device of a base station system.

Figure 4A:
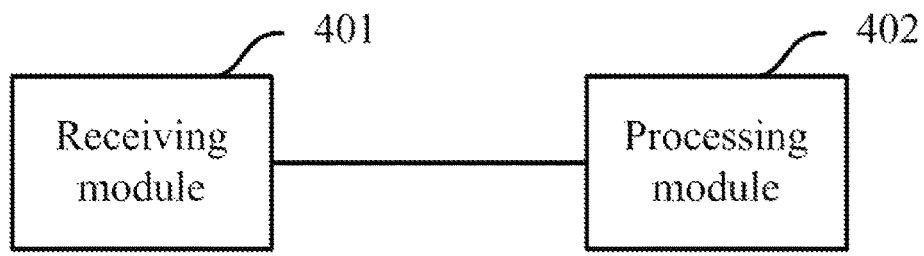

Referring to FIG. 4A which is a schematic structural diagram of a backend device according to an embodiment of the disclosure, the backend device can include a receiving module 401 and a processing module 402.

The receiving module 401 is configured to receive a signal, on which MIMO detection and related baseband processing is performed, transmitted by a front end device of the base station system.

The processing module 402 is configured to perform baseband processing different from the MIMO detection and related baseband processing on the signal received from the front end device.

In an embodiment, if the MIMO detection and related baseband processing includes the operations of converting the time-domain signal into a frequency-domain signal; performing resource de-mapping on the frequency-domain signal, and obtaining frequency-domain data of a scheduled UE; performing MIMO detection on the frequency-domain data of the scheduled UE, and obtaining a frequency-domain transmission data layer of the scheduled UE; and converting the frequency-domain transmission data layer of the scheduled UE into time-domain transmission data layer, then as illustrated in FIG. 3B, the processing module 402 includes: a codeword mapping unit 4021 and a transport block mapping unit 4022.

The codeword mapping unit 4021 is configured to map the time-domain transmission data layer of the scheduled UE to a codeword.

The transport block mapping unit 4022 is configured to process the codeword into a transport block.

Figure 4B:
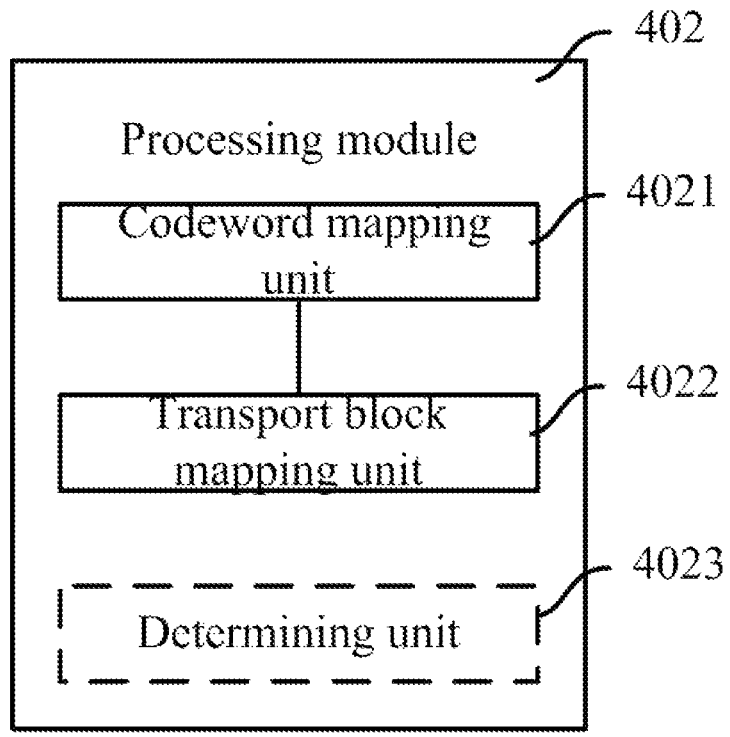
Figure 4C:
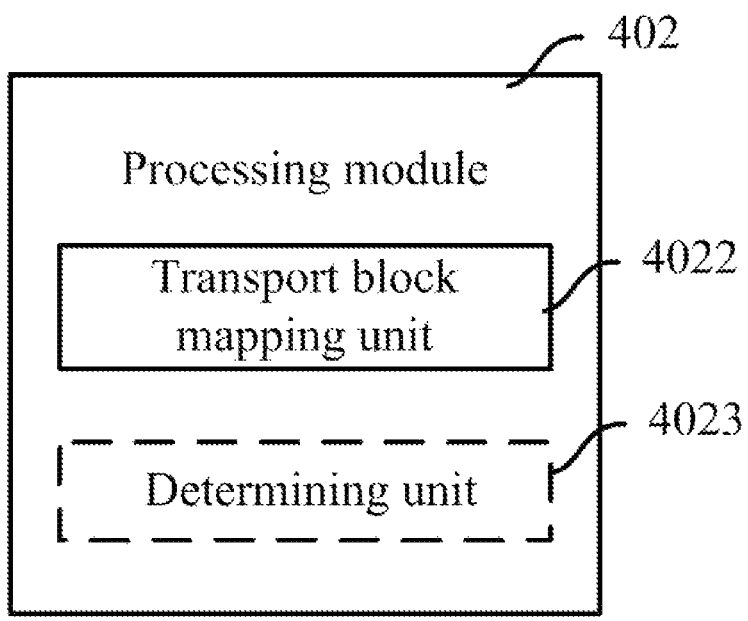

In an embodiment, if the MIMO detection and related baseband processing includes the operations of converting the time-domain signal into a frequency-domain signal; performing resource de-mapping on the frequency-domain signal, and obtaining frequency-domain data of a scheduled UE; performing MIMO detection on the frequency-domain data of the scheduled UE, and obtaining a frequency-domain transmission data layer of the scheduled UE; converting the frequency-domain transmission data layer of the scheduled UE into a time-domain transmission data layer; and mapping the time-domain transmission data layer of the scheduled UE to a codeword, then as illustrated in FIG. 4C, the processing module 402 includes the transport block mapping unit 4022 configured to process the codeword into a transport block.

Figure 4D:
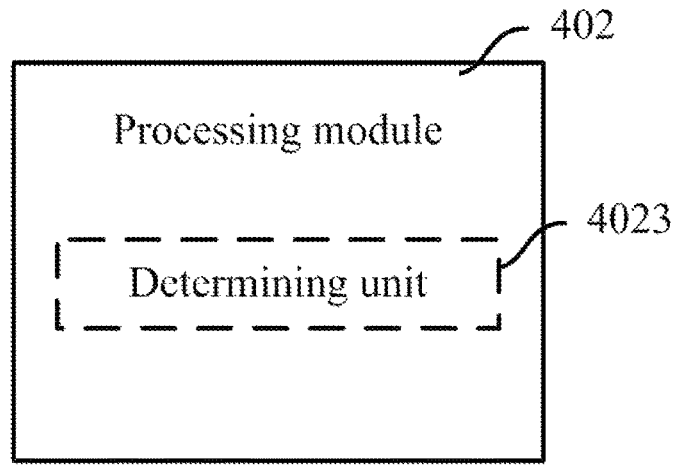

In an embodiment, in any one of the backend devices as illustrated in FIG. 4B, FIG. 4C, and FIG. 4D, the processing module 402 includes a determining unit 4023 configured to receive information about an estimated channel, interference, and noise of the scheduled UE transmitted by the front end device, to perform uplink scheduling, and determine an MIMO detection matrix of the scheduled UE, according to the estimation information, and to transmit uplink resource allocation scheme information and the MIMO detection matrix of the scheduled UE to the front end device.

Based upon the same technical idea, embodiments of the disclosure further provide a front end device and a backend device in a base station system, and a base station system including the front end device and the backend device.

Figure 5:
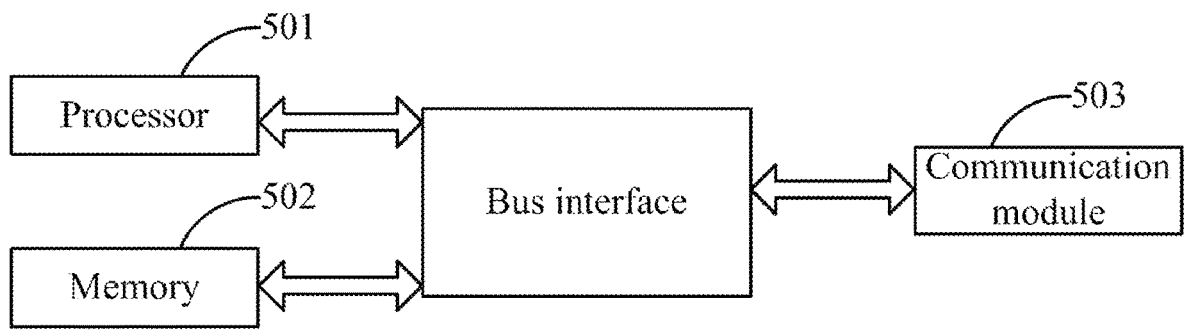
FIG. 5 is a schematic structural diagram of a front end device in the base station system according to an embodiment of the disclosure.

Reference is made to FIG. 5 which is a schematic structural diagram of a front end device of a base station system according to an embodiment of the disclosure.

As illustrated in FIG. 5, the front end device can include a processor 501, a memory 502, a communication module 503, and a bus interface.

The processor 501 is responsible for managing bus architecture and performing normal processes, and the memory 502 can store data for use by the processor 501 in performing operations. The communication module 503 is configured to be controlled by the processor 501 to receive and transmit data.

The bus architecture can include any number of interconnecting buses and bridges to particularly link together various circuits including one or more processors represented by the processor 501, and one or more memories represented by the memory 502. The bus architecture can further link together various other circuits, e.g., peripheral devices, a manostat, a power management circuit, etc., all of which are well known in the art, so a further description thereof is omitted in this context. The bus interface serves as an interface. The processor 501 is responsible for managing the bus architecture and performing normal processes, and the memory 502 can store data for use by the processor 501 in performing operations.

The flow of processing a signal according to the embodiments of the disclosure is applicable to the processor 501, or can be performed by the processor 501. In an implementation, the respective operations in the flow of processing a signal can be performed by integrated logic circuits in hardware, or instructions in software, in the processor 501. The processor 501 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the disclosure can be implemented or performed. The general-purpose processor can be a microprocessor, or can be any conventional processor, etc. The operations in the method according to the embodiment of the disclosure can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 502, and the processor 501 reads the information in the memory 502, and performs the operations in the flow of processing a signal, in combination with the hardware thereof.

In an embodiment, the processor 501 is configured to read and execute the program in the memory 502 to: receive a time-domain signal transmitted by an antenna element; perform MIMO detection and related baseband processing on the time-domain signal; and transmit the signal, on which the baseband processing is performed, to a backend device of the base station system.

In an embodiment, the processor 501 can be configured to: convert the time-domain signal into a frequency-domain signal, perform resource de-mapping on the frequency-domain signal, and obtain frequency-domain data of a scheduled UE; perform MIMO detection on the frequency-domain data of the scheduled UE, and obtain a frequency-domain transmission data layer of the scheduled UE; and convert the frequency-domain transmission data layer of the scheduled UE into a time-domain transmission data layer.

In an embodiment, the processor 501 can be further configured to map the time-domain transmission data layer of the scheduled UE to a codeword.

In an embodiment, the processor 501 can be further configured to process the codeword into a transport block.

Furthermore, the processor can be further configured estimate a channel, interference, and noise of the scheduled UE, to transmit information about the estimated channel, interference, and noise to the backend device, and to receive uplink resource allocation scheme information and an MIMO detection matrix determined by the backend device according to the estimation information.

Figure 6:
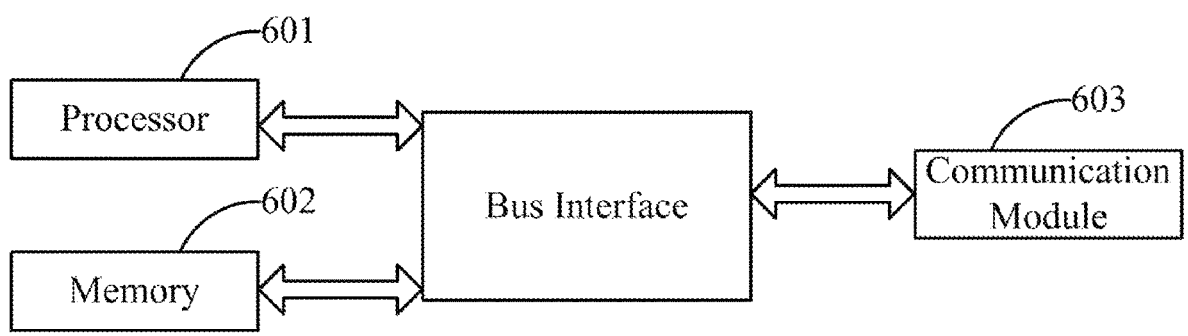
FIG. 6 is a schematic structural diagram of a backend device in the base station system according to an embodiment of the disclosure.

Reference is made to FIG. 6 which is a schematic structural diagram of a backend device of a base station system according to an embodiment of the disclosure.

As illustrated in FIG. 6, the backend device can include a processor 601, a memory 602, a communication module 603, and a bus interface.

The processor 601 is responsible for managing bus architecture and performing normal processes, and the memory 602 can store data for use by the processor 601 in performing operations. The communication module 603 is configured to be controlled by the processor 601 to receive and transmit data.

The bus architecture can include any number of interconnecting buses and bridges to particularly link together various circuits including one or more processors represented by the processor 601, and one or more memories represented by the memory 602. The bus architecture can further link together various other circuits, e.g., peripheral devices, a manostat, a power management circuit, etc., all of which are well known in the art, so a further description thereof will be omitted in this context. The bus interface serves as an interface. The processor 601 is responsible for managing the bus architecture and performing normal processes, and the memory 602 can store data for use by the processor 601 in performing operations.

The flow of processing a signal according to the embodiment of the disclosure is applicable to the processor 601, or can be performed by the processor 601. In an implementation, the respective operations in the flow of processing a signal can be performed by integrated logic circuits in hardware, or instructions in software, in the processor 601. The processor 601 can be a general-purpose processor, a digital signal processor, an application specific integrated circuit, a field programmable gate array, or another programmable logic device, discrete gate, transistor logic device, or discrete hardware component. The respective methods, operations, and logic block diagrams disclosed in the embodiments of the disclosure can be implemented or performed. The general-purpose processor can be a micro processor, or can be any conventional processor, etc. The operations in the method according to the embodiment of the disclosure can be performed directly by a hardware processor, or performed by a combination of hardware and software modules in the processor. The software module can be located in a random memory, a flash memory, a read-only memory, a programmable read-only memory, an electrically erasable and programmable memory, a register, or another storage medium known in the art. The storage medium is located in the memory 602, and the processor 601 reads the information in the memory 602, and performs the operations in the flow of processing a signal, in combination with the hardware thereof.

In an embodiment, the processor 601 is configured to read and execute the program in the memory 602 to: receive a signal, on which MIMO detection and related baseband processing is performed, transmitted by a front end device of the base station system; and perform other baseband processing than the MIMO detection and related baseband processing on the signal received from the front end device.

In an embodiment, if the baseband processing performed by the front end device includes the operations of converting the time-domain signal into a frequency-domain signal; performing resource de-mapping on the frequency-domain signal, and obtaining frequency-domain data of the scheduled UE; performing MIMO detection on the frequency-domain data of the scheduled UE, and obtaining a frequency-domain transmission data layer of the scheduled UE; and converting the frequency-domain transmission data layer of the scheduled UE into a time-domain transmission data layer, then the processor 601 can be configured to: map the time-domain transmission data layer of the scheduled UE to a codeword; and process the codeword into a transport block.

In an embodiment, if the MIMO detection and related baseband processing includes the operations of converting the time-domain signal into a frequency-domain signal; performing resource de-mapping on the frequency-domain signal, and obtaining frequency-domain data of the scheduled UE; performing MIMO detection on the frequency-domain data of the scheduled UE, and obtaining frequency-domain transmission data layers of the scheduled UE; converting the frequency-domain transmission data layers of the scheduled UE into time-domain transmission data layers; and mapping the time-domain transmission data layers of the scheduled UE to a codeword, then the processor 601 can be configured to process the codeword into a transport block.

Furthermore the processor 601 can be further configured to receive information about an estimated channel, interference, and noise of the scheduled UE transmitted by the front end device, to perform uplink scheduling, and determine an MIMO detection matrix of the scheduled UE, according to the estimation information, and to transmit uplink resource allocation scheme information and the MIMO detection matrix of the scheduled UE to the front end device.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the disclosure have been described, those skilled in the art benefiting from the underlying inventive concept can make additional modifications and variations to these embodiments. Therefore the appended claims are intended to be construed as encompassing the preferred embodiments and all the modifications and variations coming into the scope of the disclosure.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A method for processing a signal, comprising:
   receiving, by a front end device of a base station system, a time-domain signal transmitted by an antenna element;
   performing, by the front end device, multiple-input and multiple-output (MIMO) detection and related baseband processing on the time-domain signal; and
   transmitting, by the front end device, the signal, on which the baseband processing is performed, to a backend device of the base station system;
   wherein the method further comprises:
   estimating, by the front end device, a channel, interference, and noise of a scheduled UE, and transmitting information about the estimated channel, interference, and noise to the backend device; and
   performing, by the backend device, uplink scheduling, and determining an MIMO detection matrix of the scheduled UE, according to the estimation information, and transmitting uplink resource allocation scheme information and the MIMO detection matrix of the scheduled UE to the front end device.

2. The method according to claim 1, wherein performing, by the front end device, the MIMO detection and related baseband processing on the time-domain signal comprises:
   converting, by the front end device, the time-domain signal into a frequency-domain signal;
   performing, by the front end device, resource de-mapping on the frequency-domain signal, and obtaining frequency-domain data of a scheduled UE;
   performing, by the front end device, the MIMO detection on the frequency-domain data of the scheduled UE, and obtaining a frequency-domain transmission data layer of the scheduled UE; and
   converting, by the front end device, the frequency-domain transmission data layer of the scheduled UE into a time-domain transmission data layer.

3. The method according to claim 2, after transmitting, by the front end device, the signal, on which the baseband processing is performed, to the backend device of the base station system, further comprising:
   mapping, by the backend device, the time-domain transmission data layer of the scheduled UE to a codeword; and
   processing, by the backend device, the codeword into a transport block.

4. The method according to claim 2, after converting, by the front end device, the frequency-domain transmission data layer of the scheduled UE into the time-domain transmission data layer, further comprising:
   mapping, by the front end device, the time-domain transmission data layer of the scheduled UE to a codeword.

5. The method according to claim 4, after transmitting, by the front end device, the signal, on which the baseband processing is performed, to the backend device of the base station system, further comprising:
   processing, by the backend device, the codeword into a transport block.

6. The method according to claim 4, after mapping, by the front end device, the time-domain transmission data layer of the scheduled UE to the codeword, further comprising:
   processing, by the front end device, the codeword into a transport block.

7. A method for processing a signal, comprising:
   receiving, by a backend device of a base station system, a signal, on which multiple-input and multiple-output (MIMO) detection and related baseband processing is performed, transmitted by a front end device of the base station system; and
   performing, by the backend device, other baseband processing different from the MIMO detection and related baseband processing on the signal received from the front end device;
   wherein the method further comprises:
   receiving, by the backend device, information about an estimated channel, interference, and noise of a scheduled UE transmitted by the front end device;
   performing uplink scheduling and determining an MIMO detection matrix of the scheduled UE, according to the estimation information; and
   transmitting uplink resource allocation scheme information and the MIMO detection matrix of the scheduled UE to the front end device.

8. The method according to claim 7, wherein if the MIMO detection and related baseband processing comprises the operations of:

converting the time-domain signal into a frequency-domain signal;
performing resource de-mapping on the frequency-domain signal, and obtaining frequency-domain data of a scheduled UE;
performing MIMO detection on the frequency-domain data of the scheduled UE, and obtaining a frequency-domain transmission data layer of the scheduled UE; and
converting the frequency-domain transmission data layer of the scheduled UE into a time-domain transmission data layer,
then the other baseband processing comprises:
mapping the time-domain transmission data layer of the scheduled UE to a codeword; and
processing the codeword into a transport block.

9. The method according to claim 7, wherein if the MIMO detection and related baseband processing comprises the operations of:
converting the time-domain signal into a frequency-domain signal;
performing resource de-mapping on the frequency-domain signal, and obtaining frequency-domain data of a scheduled UE;
performing MIMO detection on the frequency-domain data of the scheduled UE, and obtaining a frequency-domain transmission data layer of the scheduled UE;
converting the frequency-domain transmission data layer of the scheduled UE into a time-domain transmission data layer; and
mapping the time-domain transmission data layer of the scheduled UE to a codeword,
then the other baseband processing comprises:
processing the codeword into a transport block.

10. A front end device of a base station system, comprising:
a transceiver;
a processor; and
a memory storing at least one instruction, wherein the processor is configured to execute the at least one instruction to:
control the transceiver to receive a time-domain signal transmitted by an antenna element;
perform multiple-input and multiple-output (MIMO) detection and related baseband processing on the time-domain signal;
control the transceiver to transmit the signal, on which the baseband processing is performed, to a backend device of the base station system;
estimate a channel, interference, and noise of a scheduled UE;
control the transceiver to transmit information about the estimated channel, interference, and noise to the backend device; and
control the transceiver to receive uplink resource allocation scheme information and an MIMO detection matrix determined by the backend device according to the estimation information.

11. The device according to claim 10, wherein the processor is further configured to execute the at least one instruction to:
convert the time-domain signal into a frequency-domain signal;
perform resource de-mapping on the frequency-domain signal, and to obtain frequency-domain data of a scheduled UE;
perform MIMO detection on the frequency-domain data of the scheduled UE, and to obtain a frequency-domain transmission data layer of the scheduled UE; and
convert the frequency-domain transmission data layer of the scheduled UE into a time-domain transmission data layer.

12. The device according to claim 11, wherein the processor is further configured to execute the at least one instruction to map the time-domain transmission data layer of the scheduled UE to a codeword.

13. The device according to claim 12, wherein the processor is further configured to execute the at least one instruction to process the codeword into a transport block.

14. A backend device of a base station system, comprising:
a receiver;
a processor; and
a memory storing at least one instruction, wherein the processor is configured to execute the at least one instruction to:
control the receiver to receive a signal, on which multiple-input and multiple-output (MIMO) detection and related baseband processing is performed, transmitted by a front end device of the base station system;
perform other baseband processing different from the MIMO detection and related baseband processing on the signal received from the front end device;
control the receiver to receive information about an estimated channel, interference, and noise of a scheduled UE transmitted by the front end device;
perform uplink scheduling;
determine an MIMO detection matrix of the scheduled UE, according to the estimation information; and
control the transmitter to transmit uplink resource allocation scheme information and the MIMO detection matrix of the scheduled UE to the front end device.

15. The device according to claim 14, wherein if the MIMO detection and related baseband processing comprises the operations of:
converting the time-domain signal into a frequency-domain signal;
performing resource de-mapping on the frequency-domain signal, and obtaining frequency-domain data of a scheduled UE;
performing MIMO detection on the frequency-domain data of the scheduled UE, and obtaining a frequency-domain transmission data layer of the scheduled UE; and
converting the frequency-domain transmission data layer of the scheduled UE into a time-domain transmission data layer,
then the processor is further configured to execute the at least one instruction to:
map the time-domain transmission data layer of the scheduled UE to a codeword; and
process the codeword into a transport block.

16. The device according to claim 14, wherein if the MIMO detection and related baseband processing comprises the operations of:
converting the time-domain signal into a frequency-domain signal;
performing resource de-mapping on the frequency-domain signal, and obtaining frequency-domain data of a scheduled UE;
performing MIMO detection on the frequency-domain data of the scheduled UE, and obtaining a frequency-domain transmission data layer of the scheduled UE;

converting the frequency-domain transmission data layer of the scheduled UE into a time-domain transmission data layer; and mapping the time-domain transmission data layer of the scheduled UE to a codeword, then the processor is further configured to execute the at least one instruction to process the codeword into a transport block.

* * * * *